US009641788B2

(12) United States Patent
Lee

(10) Patent No.: US 9,641,788 B2
(45) Date of Patent: May 2, 2017

(54) IMAGE PROCESSING APPARATUS AND CONTROL METHOD FOR THERMAL MITIGATION OF SUB PROCESSORS

(71) Applicant: SAMSUNG ELECTRONICS CO., LTD., Suwon-si (KR)

(72) Inventor: Il-Young Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 87 days.

(21) Appl. No.: 14/538,325

(22) Filed: Nov. 11, 2014

(65) Prior Publication Data

US 2015/0156445 A1     Jun. 4, 2015

(30) Foreign Application Priority Data

Dec. 3, 2013 (KR) ......................... 10-2013-0149053

(51) Int. Cl.
*G06F 1/20* (2006.01)
*H04N 5/63* (2006.01)
(Continued)

(52) U.S. Cl.
CPC ............. *H04N 5/63* (2013.01); *G06F 1/206* (2013.01); *G06F 1/3287* (2013.01);
(Continued)

(58) Field of Classification Search
CPC ....... G06F 1/206; G06F 1/3287; G06F 1/3296
See application file for complete search history.

(56) References Cited

U.S. PATENT DOCUMENTS 8,395,898 B1 * 3/2013 Chamseddine ......... G06F 1/203
361/694
2002/0196606 A1 12/2002 Hirao et al.
(Continued)

FOREIGN PATENT DOCUMENTS

KR      1020060109039 A      10/2006
KR      1020100054669 A      5/2010
KR      1020110096930 A      8/2011

OTHER PUBLICATIONS

Communication issued on Feb. 24, 2015 by the International Searching Authority in related Application No. PCT/KR2014/010569.

*Primary Examiner* — Albert Wang
(74) *Attorney, Agent, or Firm* — Sughrue Mion, PLLC

(57) ABSTRACT

An image processing apparatus and control method is provided. The image processing apparatus includes a processor including one or more processing modules configured to process data, a power supply configured to supply an operating voltage to the one or more processing modules in a normal operation mode, a sensor configured to detect a temperature of the processor, and a controller configured to change the processor from the normal operation mode to one of a first operation mode and a second operation mode according to the temperature detected by the sensor, control the power supply to supply a lower level operating voltage to at least one of the one or more processing modules when the processor is in the first operation mode, and reset or disable at least one processing module selected from the one or more processing modules when the processor is in the second operation mode.

16 Claims, 7 Drawing Sheets

(51) Int. Cl.
    *H04N 21/443*    (2011.01)
    *G06F 1/32*      (2006.01)
    *H04N 21/442*    (2011.01)

(52) U.S. Cl.
    CPC ....... *G06F 1/3296* (2013.01); *H04N 21/4424* (2013.01); *H04N 21/4436* (2013.01)

(56) References Cited

U.S. PATENT DOCUMENTS

2010/0332799 A1* 12/2010 Sonobe .................. G06F 1/206
                                              712/43
2012/0221872 A1   8/2012 Artman et al.
2013/0328890 A1* 12/2013 Avkarogullari ....... G06F 1/3234
                                              345/501
2014/0006818 A1*  1/2014 Doshi ................... G06F 1/3203
                                              713/320

* cited by examiner

IMAGE PROCESSING APPARATUS AND CONTROL METHOD FOR THERMAL MITIGATION OF SUB PROCESSORS

CROSS-REFERENCE TO RELATED APPLICATION

This application claims priority from Korean Patent Application No. 10-2013-0149053, filed on Dec. 3, 2013 in the Korean Intellectual Property Office, the disclosure of which is incorporated herein by reference in its entirety.

BACKGROUND

Field

Apparatuses and methods consistent with exemplary embodiments relate to an image processing apparatus configured to process image data externally received or previously stored to display an image and a control method thereof, and more particularly, to an image processing apparatus having an improved structure of efficiently cooling heat generated in the image processing apparatus and a control method thereof.

Description of the Related Art

An image processing apparatus may processes image signals/image data received from an outside source according to one or various image processing practices. Additionally, the image processing apparatus may display an image based on a processed image signal on its own display panel or output the processed image signal to a separate display apparatus that may include a panel so that an image is displayed on that separate display apparatus. The image processing apparatus may include any device capable of processing image data, regardless of whether it includes a panel to display an image or does not. For example, an image processing apparatus having a display panel is a TV, while an image processing apparatus having no display panel is a set-top box.

As technology advances, a variety of additional and extended functions and features are applied and required of the image processing apparatus. Thus, the image processing apparatus may be required to have increased system load and operation processing speed to process such features and functions. To this end, a central processing unit (CPU), an integrated circuit (IC), a chipset and/or an image processing board may be configured by mounting the foregoing components on a printed circuit board (PCB) and may be embedded in the image processing apparatus. Inevitably, these components may generate substantial heat, and thus the image processing apparatus may have a structure to dissipate heat providing a form of system cooling.

As a cooling structure, the image processing apparatus may employ a heat sink or heat pipe constructed of thermally conductive materials to dissipate and discharge heat generated from the image processing board out and away from the image processing apparatus, and may also make use of a fan rotated by a motor to circulate external air along the image processing board, or may adopt a structure of discharging heated air from the image processing apparatus to the outside.

SUMMARY

According to an aspect of an exemplary embodiment, there is provided an image processing apparatus including a processor including one or more processing modules configured to process data, a power supply configured to supply an operating voltage to the one or more processing modules in a normal operation mode, a sensor configured to detect a temperature of the processor, and a controller configured to change the processor from the normal operation mode to one of a first operation mode and a second operation mode according to the temperature detected by the sensor, control the power supply to supply a lower level operating voltage to at least one of the one or more processing modules when the processor is in the first operation mode, and reset or disable at least one processing module selected from the one or more processing modules when the processor is in the second operation mode.

The lower level operating voltage may be within a voltage range configured to ensure a normal operation of the one or more processing modules when the processor is in the first operation mode.

The controller may be further configured to change the processor to the first operation mode in response to the temperature detected by the sensor being higher than a first temperature, and wherein the controller may be further configured to change the processor to the second operation mode in response to the temperature detected by the sensor being higher than a second temperature while the processor operates in the first operation mode.

The image processing apparatus may further include a ventilation fan configured to be driven to cool the processor, wherein the processor is configured to operate in a third operation mode in which the ventilation fan operates, and wherein the controller is further configured to change the processor to the third operation mode in response to the temperature detected by the sensor being higher than a third temperature while the processor operates in the second operation mode.

The first temperature may be set higher than the second temperature, and wherein the second temperature is set higher than the third temperature.

The first temperature, the second temperature, and the third temperature may be set to a same value.

The controller, when the processor is in the second operation mode, may be further configured to select at least one processing module that is provided with the operating voltage from the power supply but does not currently operate among the one or more processing modules.

The controller may be further configured to display a message reporting system abnormality through a display in response to a cooling process including the first operation mode and the second operation mode being sequentially implemented being performed at least a preset number of times within a preset time period.

The image processing apparatus may further include a display unit, wherein the sensor detects temperature of at least one of the processor and the display unit.

According to an aspect of another exemplary embodiment, there is provided a control method of an image processing apparatus, the control method including supplying operating voltage to one or more processing modules of a processor configured to process data in a normal operation mode, detecting a temperature of the processor, and changing the processor from the normal operation mode to one of a first operation mode and a second operation mode according to the detected temperature, wherein the changing the processor to one of the first operation mode and the second operation mode includes supplying a lower level operating voltage, that is lower than the operating voltage supplied to the one or more processing modules when the processor is in the normal operation mode, to the one or more processing modules when the processor is in the first operation mode, and resetting or disabling at least one processing module selected from the processing modules in the second operation mode.

The supplying the lower level operating voltage may include decreasing a level of the lower level operating voltage to within a voltage range configured to ensure a normal operation of the processing modules.

The changing the processor to one of the first operation mode and the second operation mode may include changing the processor to the first operation mode in response to the detected temperature being higher than a first temperature, and changing the processor to the second operation mode in response to the detected temperature being higher than a second temperature while the processor operates in the first operation mode.

The image processing apparatus may further include a ventilation fan configured to be driven to cool the processor, and wherein the changing the processor to one of the first operation mode and the second operation mode includes changing the processor to a third operation mode in which the ventilation fan operates in response to the detected temperature being higher than a third temperature while the processor operates in the second operation mode.

The first temperature may be set higher than the second temperature, and wherein the second temperature may be set higher than the third temperature.

The first temperature, the second temperature, and the third temperature may be set to a same value.

The resetting or disabling the at least one processing module selected from the processing modules may include selecting at least one processing module that is provided with the operating voltage from the power supply but does not currently operate among the processing modules.

The changing the processor to one of the preset first operation mode and the preset second operation mode may include displaying a message reporting system abnormality in response to a cooling process including the first operation mode and the second operation mode being sequentially implemented being performed at least a preset number of times within a preset time period.

The image processing apparatus may further include a display unit, and wherein the detecting the temperature of the processor includes detecting temperature of at least one of the processor and the display unit.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Hereinafter, exemplary embodiments will be described in detail with reference to the accompanying drawings. In the following description, constituent parts or elements directly related to the exemplary embodiments will be described only, and descriptions of other parts or elements will be omitted. However, it should be noted that the omitted parts or elements are not construed as being unnecessary in configuring a device or system according to the exemplary embodiments.

Figure 1:
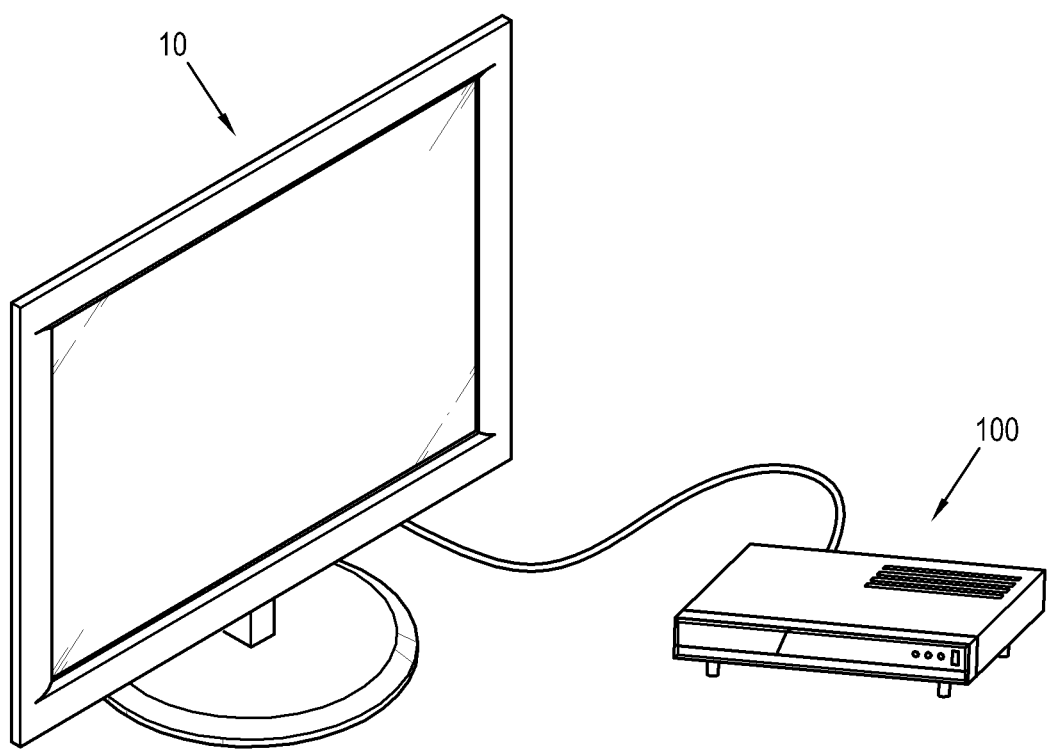
FIG. 1 illustrates an image processing apparatus according to an exemplary embodiment.

FIG. 1 illustrates image processing apparatuses 100 and 200 according to an exemplary embodiment.

As shown in FIG. 1, the image processing apparatuses 100 and 10 according to the present exemplary embodiment may include a set-top box 100 incapable of autonomously displaying an image and/or a display apparatus 10 capable of displaying an image by itself, such as a television (TV). Although the present exemplary embodiment illustrates that the image processing apparatus 100 is provided as a set-top box, any electronic device which generates heat while operating may be also applicable, without limiting the scope of application to the exemplary embodiment.

Further, according to one or more exemplary embodiments, the TV and set-top box may be communicatively connected wirelessly. Further, the set-top box may be configured to provide image data to a plurality of displays. For example, the set-top box may provide a video to a TV while providing details and pictures relating to the video to a handheld device such as a smartphone or a remote control than has a built-in display.

The image processing apparatus 100 may process image data of content externally received either in real time or at predetermined time after storage. The image processing apparatus may thereby display an image of the content on an external display apparatus. Although the image processing apparatus 100 is provided as a set-top box in the present exemplary embodiment, various types of image processing apparatuses 100 capable of displaying an image based on image data may be also employed. For example, the set-top box 100 may instead be implemented as a component within a television, within a game console, or within a personal computer.

The image processing apparatus 100 may include an embedded image processing board for processing image data, in which heat is generated from the image processing board depending on a system load level due to an operation of the image processing board. A heat generation phenomenon causes an increase in temperature of the image processing apparatus 100 and temperature of the image processing board in the image processing apparatus 100, resulting in not only deterioration in performance of the image processing apparatus 100 or image processing board but may also decrease the life of the image processing apparatus 100. Thus, the image processing apparatus 100 may adopt a structure that allows for externally discharging heat or cooling the heated elements generated internally, which will be described.

Hereinafter, a configuration of an image processing apparatus will be described in detail.

Figure 2:
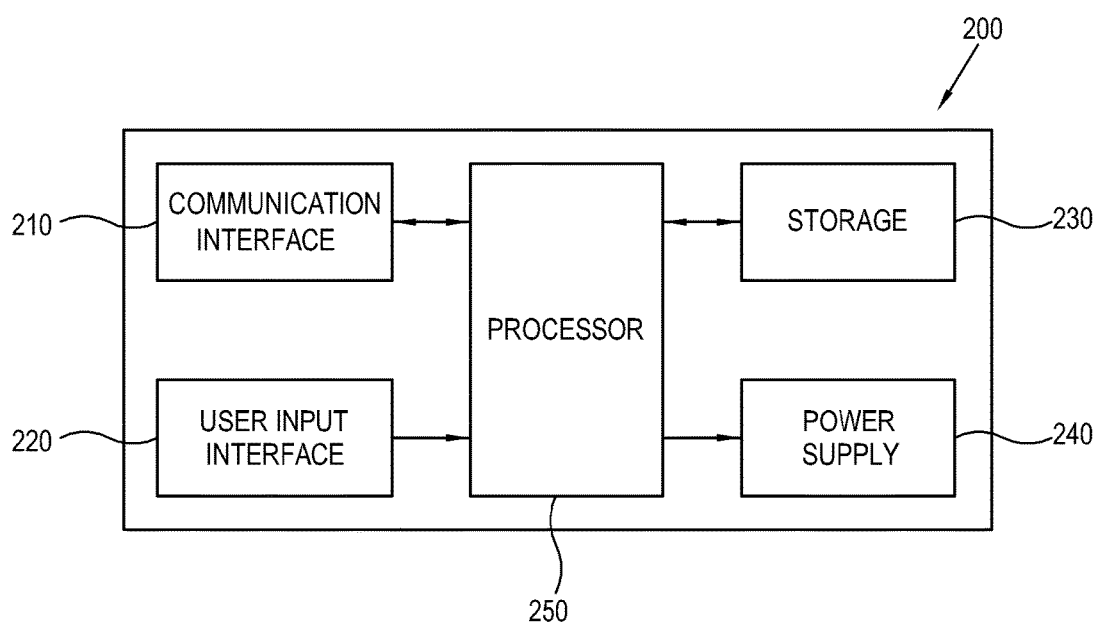
FIG. 2 is a block diagram illustrating a basic configuration of an image processing apparatus according to an exemplary embodiment.

FIG. 2 is a block diagram illustrating a basic configuration of the image processing apparatus 100.

As shown in FIG. 2, an image processing apparatus 200 according to an exemplary embodiment may include a communication interface 210 configured to conduct communications including, for example, transmitting and receiving data/signals, a user input interface 220 used by a user to perform an input operation, a storage 230 configured to store data/information, a power supply 240 configured to provide power and a processor 250 configured to process data received by the communication interface 210 according to a preset process The communication interface 210 may conduct data transmission and reception to enable the image processing apparatus 200 to conduct two-way communications with a server or other external devices. The communication interface 210 may connects to the outside device or server using a wire-based/wireless wide area network (WAN)/local area network (LAN) or a local access method according to a preset communication protocol.

As the communication interface 210 may be configured as an assembly of connection ports or connection modules for respective devices, a protocol for connection or a connection target is not limited to a single kind or format.

Because signal transmission and reception may be achieved according to a protocol specified for each connected device, the communication interface 210 may transmit and receive a signal based on an individual connection protocol for each connected device. For example, in the case of image data, the communication interface 210 may transmit and receive a radio frequency (RF) signal and various signals in accordance with composite video, component video, super video, Syndicat des Constructeurs d'Appareils Radiorécepteurs et Téléviseurs (SCART), high definition multimedia interface (HDMI), DisplayPort, unified display interface (UDI) or wireless high-definition (HD) standards.

The user input interface 220 may transmit various preset control commands or information to the processor 250 based on a user's manipulations or inputs. The user input interface 220 may arrange various events happening by a user based on a user's intent into information and transmit the information to the processor 250. For example, various forms of events may happen due to a user's usage, for example, a manipulation, an utterance and a gesture.

The storage 230 may store various types of data according to control by the processor 250. The storage 230 may be configured as a nonvolatile memory, such as a flash memory and a hard disk drive (HDD), so as to save data regardless of supply of system power. The storage 230 may be accessed by the processor 250 to read, record, revise, delete or update pre-stored data.

The power supply 240 may convert external alternating current (AC) power into direct current (DC) power and adjusts the DC power to an appropriate level of voltage for each component in the image processing apparatus 200 to output to the component. The power supply 240 may be configured as a switching mode power supply (SMPS).

The processor 250 may perform various processes on data/signals received by the communication interface 210. For example, when the communication interface 210 receives image data, the processor 250 may perform an image processing process on the image data and output the processed image data to an external display apparatus so that an image is displayed on the display apparatus. According to another example, when the communication interface 210 receives a broadcast signal, the processor 250 may extract an image, an audio, and additional data from the broadcast signal tuned to a particular channel and may adjust the image to a preset resolution to output the image.

The processor 250 may perform any kind of image processing, without being limited to, for example, decoding corresponding to an image format of image data, de-interlacing to convert interlaced image data into a progressive form, scaling to adjust image data to a preset resolution, noise reduction to improve image quality, detail enhancement, frame refresh rate conversion, or the like.

The processor 250 may perform various processes based on data types and characteristics, without being limited to image processing processes. Further, data to be processed by the processor 250 is not necessarily received by the communication interface 210. For example, when a user's utterance is input through the user input interface 220, the processor 250 may process the utterance according to a preset audio processing process. Further, when a user's gesture is detected by the user input interface 220, the processor 250 may process a detection result according to a preset gesture processing process.

The processor 250 may be configured as an image processing board formed by mounting an integrated multifunctional component, such as a system on chip (SOC), or a processing module including an individual functional chipset, an integrated circuit (IC) and central processing unit (CPU) components on a printed circuit board (PCB). The processing module may be supplied with a preset level of voltage from the power supply 240 to operate.

In the image processing apparatus 200 with the foregoing structure, heat generated particularly from the processor 250 causes an increase in temperature of the image processing apparatus 200, and accordingly a structure or method for cooling such heat may be implemented to dissipate that generated heat.

A heat sink or heat pipe may be installed in or on the processor 250, or a fan may be provided to push cooled air over the processor 250 and/or discharges heated air around the processor 250 toward the outside, thereby cooling the processor 250. In a cooling structure using a fan, for example, when temperature of heat generated from the processor 250 is a preset level or higher, a fan may operate.

Because a system using the heat sink or heat pipe may need an installation space for the heat sink or heat pipe, it may not be easy to install a heat sink or heat pipe for each diverse module in the processor 250. Further, the heat sink/heat pipe may include metallic materials for efficient heat radiation or heat transfer, causing an increased weight burden on the processor 250.

The cooling structure using the fan, in which the fan is rotated by a motor, may involve a noise problem. Further, heat may be generated by the motor of the fan itself, and dust may be adsorbed onto the fan or the processor 250 by airflow induced by rotation of the fan. When the dust is adsorbed, cooling efficiency decreases, and accordingly the fan needs to more frequently operate for cooling the processor 250, causing a perpetuating cycle of severe adsorption of dust.

Thus, even when the cooling structure using the fan is applied, the image processing apparatus 200 may need a method of securing cooling effects while driving the fan as little as possible.

Figure 3:
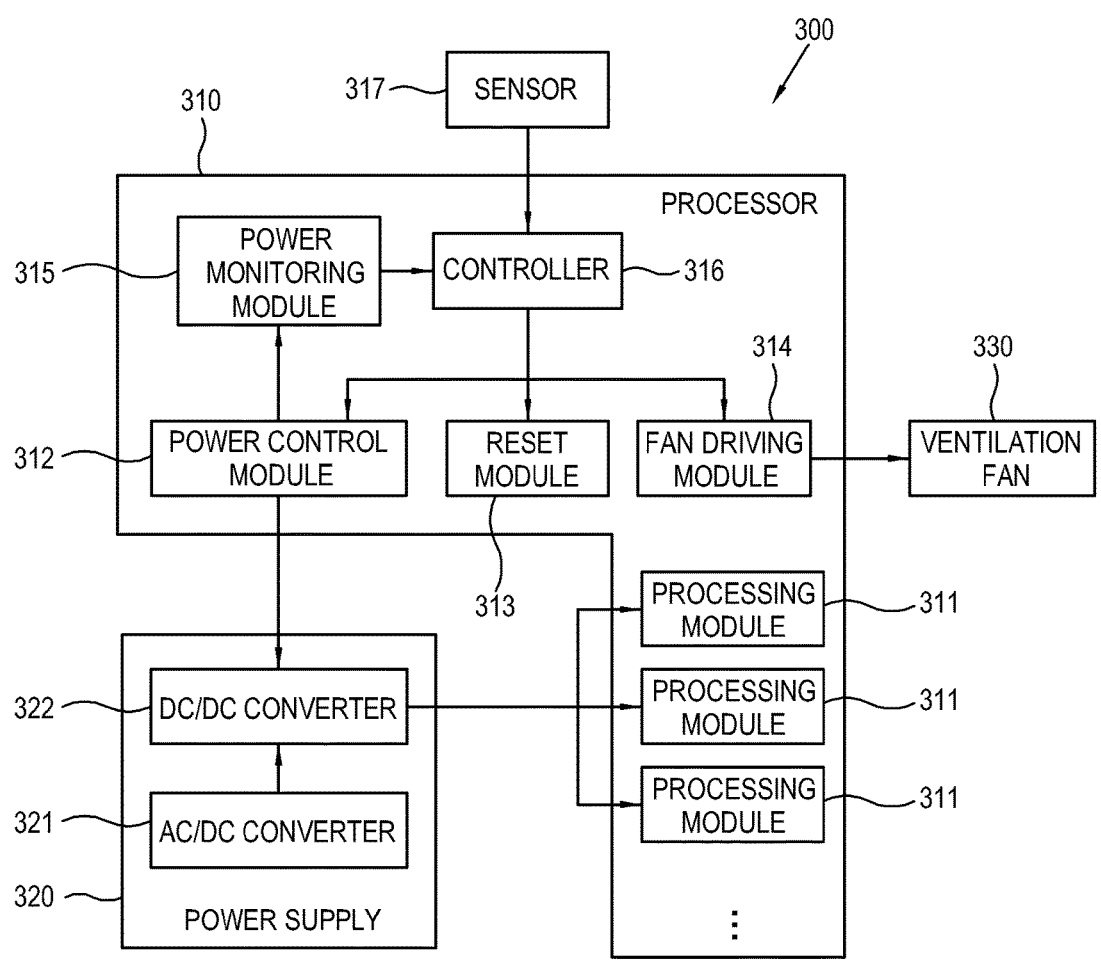
FIG. 3 is a block diagram of a configuration illustrating a cooling principle through voltage control of an image processing apparatus according to an exemplary embodiment.

FIG. 3 is a block diagram of a configuration illustrating a cooling principle through voltage control of an image processing apparatus 300 according to an exemplary embodiment.

As shown in FIG. 3, the image processing apparatus 300 may include a processor 310, a power supply 320 and a ventilation fan 330 configured to circulate air so as to cool the processor 310. The processor 310 and the power supply 320 of the present exemplary embodiment may be substantially similar to the processor 250 and the power supply 240 as shown in FIG. 2.

The processor 310 may include one or more processing modules 311 that each perform preset functions of the processor 310, a power control module 312 configured to control voltage output of the power supply 320, a reset module 313 configured to reset the power supply 320, a fan driving module 314 configured to control operation of the ventilation fan 330, a power monitoring module 315 configured to monitor a control state of the power control module 312 and a controller 316 configured to control an operation of each module of the processor 310. In addition, the processor 310 may include or be connected with a sensor 317 configured to detect temperature of the processor 310.

These modules 311, 312, 313, 314, 315 and 316 are classified according to conducting functions for convenience and are not construed to limit the processor 310 to any one configuration. The modules 311, 312, 313, 314, 315 and 316 may be configured as hardware, or some of the modules may be configured as software. The modules 311, 312, 313, 314, 315 and 316 forming the processor 310 may perform separate operations, respectively, or the processor 310 may sequentially perform all operations without being divided into the modules 311, 312, 313, 314, 315 and 316.

The power supply 320 may include a AC/DC converter 321 to convert AC power from the outside into a first voltage as DC and a DC/DC converter 322 to convert the first voltage output from the AC/DC converter 321 into different levels of second voltages corresponding to the respective processing modules 311 and output the second voltages to the processing modules 311.

The processing modules 311 are units for performing various kinds of functions of the processor 310 and may be configured as diverse forms, such as an IC, a chipset and a CPU. One processing module 311 may be a single IC or chipset or may be a plurality of ICs or a chipset group. The processing modules 311 are provided with a preset level of voltage for own operations from the DC/DC converter 322.

Here, voltages for the operations of the processing modules 311 have a secure voltage range ensuring normal operations of the processing modules 311, which is preset through an experiment by a manufacturer. For example, consider an experimental result showing that one processing module 311 needs a voltage level of 1.5V for operating and the processing module 311 operates normally as long as a voltage ranging 1.5 V±0.1 V is supplied. In this case, the processing module 311 has an operating voltage level of 1.5 V and a secure voltage range of 1.5 V±0.1 V or 1.4~1.6 V. That is, the processing module 311 may be expected to normally operate even when a voltage of 1.4 V is supplied, not 1.5 V.

The power control module 312 adjusts a voltage level that the DC/DC converter 322 outputs to each processing module 311. For instance, when the DC/DC converter 322 outputs a voltage level of 1.5 V to one processing module 311, the power control module 312 may control the DC/DC converter 322 so as to decrease the output level to 1.4 V or increase the output level to 1.6 V if necessary. The power control module 312 performs such a control operation based on a control signal received from the controller 316.

The reset module 313 resets or disables the processing modules 311. For example, the reset module 313 transmits a reset signal to one processing module 311, or blocks voltage output from the DC/DC converter 322 to the processing module 311 and then allows the voltage again, thereby resetting the processing module 311. Also, the reset module 313 may continue to block the voltage output from the DC/DC converter 322 to the processing module 311, thereby disabling the processing module 311.

The fan driving module 314 controls voltage output to the ventilation fan 330, thereby controlling operation of the ventilation fan 330. The fan driving module 314 may be provided with voltage for driving the ventilation fan 330 from the DC/DC converter 322 and transmit the voltage to the ventilation fan 330, or control voltage output from the DC/DC converter 322 to the ventilation fan 330.

The power monitoring module 315 may monitor a state of voltage output from the DC/DC converter 322 according to control by the power control module 312 and transmit a monitoring result to the controller 316. For example, when the voltage output from the DC/DC converter 322 is out of an allowable range, the power monitoring module 315 notifies the controller 316 that the voltage output from the DC/DC converter 322 is out of the allowable range so that the power control module 312 may conduct controlling operations.

The sensor 317 may detect internal temperature of the image processing apparatus 300 or a specific temperature of a particular component such as the processor 310 and may transmit a detection result to the controller 316. Installed locations, kinds and numbers of sensors 317 may be changed depending on designs, without being particularly limited. For instance, the sensor 317 may be an element for periodically transmitting the temperature of the processor 310 to the controller 316, or an element for informing the controller 316 that the temperature of the processor 310 rises to a preset level or higher.

The controller 316 transmits an operation control signal for the modules 312, 313 and 314 based on information transmitted from the sensor 317 or the power monitoring module 315.

Particularly, the controller 316 according to the present exemplary embodiment may operate as follows. In the present exemplary embodiment, an initial state refers to a normal mode in which the ventilation fan 330 does not operate.

When the temperature of the processor 310 is determined to be a preset first temperature or higher based on a detection result by the sensor 317, the controller 316 controls the processor 310 to operate in a first operation mode. During the first operation mode, when the temperature of the processor 310 is determined to be a preset second temperature or higher, the controller 310 controls the processor 310 to operate in a second operation mode. During the second operation mode, when the temperature of the processor 310 is determined to be a preset third temperature or higher, the controller 310 controls the processor 310 to operate in a third operation mode.

In the first operation mode, the controller 316 controls the power control module 312 to decrease voltage output from the DC/DC converter 322 to at least one processing module 311 within a secure voltage range ensuring a normal operation of the processing module 311.

In the second operation mode, the controller 316 controls the reset module 313 to reset or disable some selected processing modules 311 among a plurality of processing modules 311.

In the third operation mode, the controller 316 controls the fan driving module 314 to operate the ventilation fan 330.

The controller 316 returns the operation modes to original states when the temperature detected by the sensor 317 decreases below the first temperature, the second temperature or the third temperature. For example, the controller 316 changes the processor 310 from the third operation mode to the second operation mode when the temperature of the processor 310 decreases below the third temperature while operating in the third operation mode. The controller 316 changes the processor 310 from the second operation mode to the first operation mode when the temperature of the processor 310 decreases below the second temperature while operating in the second operation mode. The controller 316 changes the processor 310 from the first operation mode to the normal mode when the temperature of the processor 310 decreases below the first temperature while operating in the first operation mode.

Also, the controller 316 changes the processor 310 from the third operation mode directly to the normal mode when the temperature of the processor 310 decreases below the first temperature while operating in the third operation mode.

Here, the first temperature, the second temperature and the third temperature may be changed, without being limited to particular values. Further, the first temperature, the second temperature and the third temperature may be the same or different depending on designs.

Here, the second operation mode is an aggressive cooling method as compared with the first operation mode, and the third operation mode is an aggressive cooling method as compared with the second operation mode. That is, in normal operation, the temperature of the processor 310 is expected to decrease in the second operation mode as compared with the first operation mode, and also in the third operation mode as compared with the second operation mode. In view of this, the second temperature may be set lower than the first temperature, and the third temperature may be set lower than the second temperature.

Figure 4:
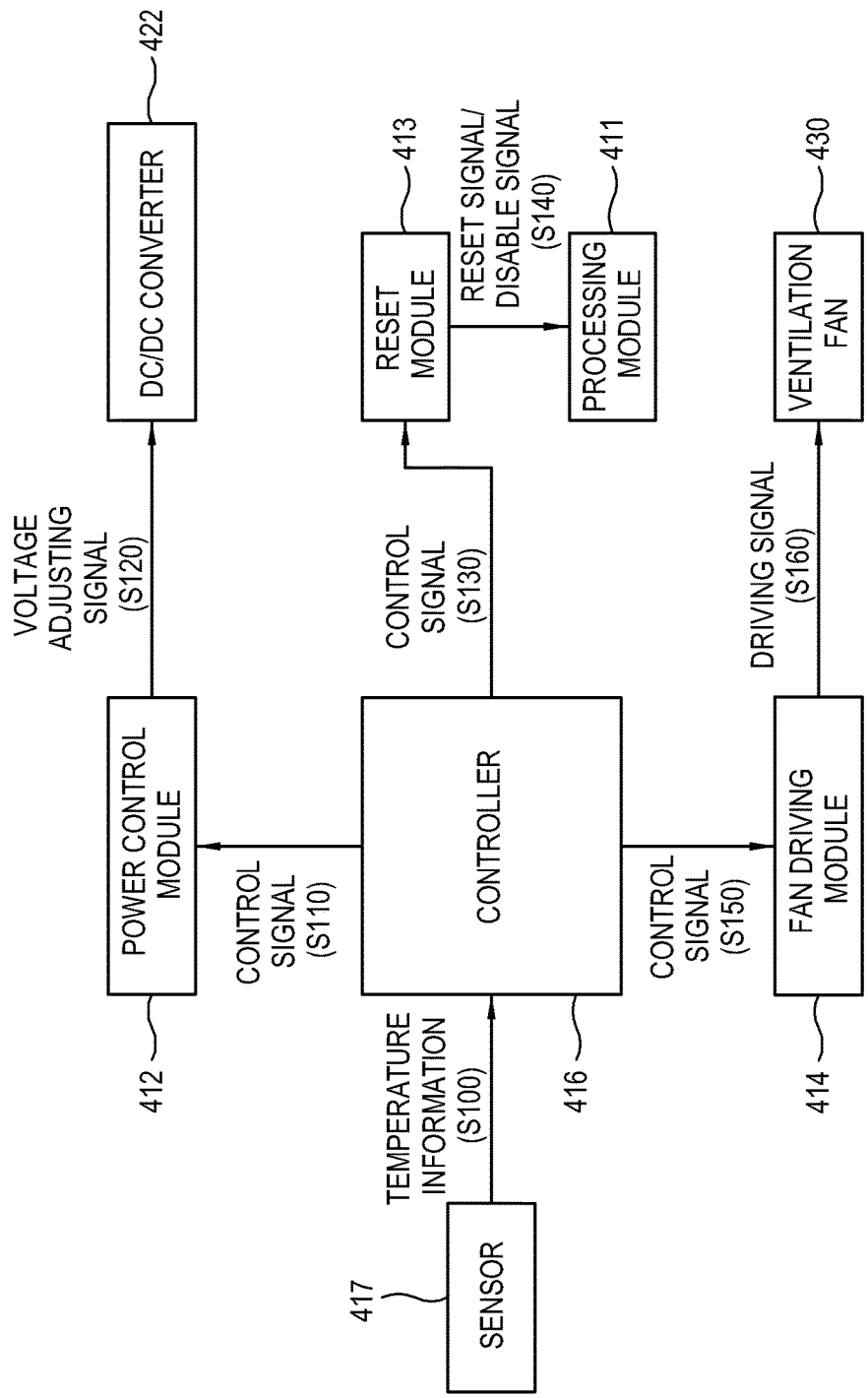
FIG. 4 illustrates transmission of signals and information among components of a processor of an image processing apparatus according to an exemplary embodiment.

FIG. 4 illustrates transmission of signals and information among the components of a processor according to an exemplary embodiment.

As shown in FIG. 4, a controller 416 monitors temperature information periodically transmitted from the sensor 417 (S100). If the temperature detected by the sensor 417 increases to the first temperature or higher, the controller 416 transmits, to the power control module 412, a control signal to reduce output voltage to a processing module 411 to a preset value within a secure voltage range (S110).

The power control module 412 transmits a voltage adjusting signal to the DC/DC converter 422 so as to reduce the output voltage of the DC/DC converter 422 to the processing module 411 (S120). For instance, if one processing module 411 has a secure voltage range of 3 V±0.2 V, the power control module 412 controls to output 2.85 V to the processing module 411.

When the temperature detected by the sensor 417 increases to the second temperature or higher, the controller 416 transmits, to the reset module 413, a control signal to reset or disable a processing module 411 (S130).

The reset module 413 selects one or some processing modules 411 among a plurality of processing modules 411 according to a preset condition and transmits a reset signal or disable signal to the selected one or more processing modules 411 (S140). In this case, diverse conditions may be used to select a processing module 411, for example, a processing module 411 that does not currently operate but is provided with voltage is selected. Specifically, a wireless communication module that is not currently performing network communications or a USB connection module or e-SATA connection module that is not connected with an external device may be selected.

When the temperature detected by the sensor 417 increases to the third temperature or higher, the controller 416 transmits, to the fan driving module 414, a control signal to drive the ventilation fan 430 (S150).

The fan driving module 414 outputs a driving signal or driving voltage to the ventilation fan 430 so that the ventilation fan 430 operates (S160).

A series of cooling processes described above may reduce the temperature of the processor 410 while the ventilation fan 430 operates as little time as possible.

Although the first operation mode, the second operation mode and the third operation mode are sequentially implemented according to the temperature of the processor 410 in the cooling processes according to the present exemplary embodiment, such processes may be also employed for an image processing apparatus that does not have a ventilation fan. In this case, the first operation mode and the second operation mode are sequentially carried out, without the third operation mode, in the cooling processes.

When the series of cooling processes including the first operation mode, the second operation mode and the third operation mode are performed a preset number of times or more for a preset time period, the image processing apparatus may display a message reporting system abnormality through a display provided in the image processing apparatus. For instance, when an excessive number of cooling processes are carried out for a short period, the cooling processes may not normally work due to problems occurring in at least some components of the processor 410 or other causes.

Further, the image processing apparatus may display a message reporting a current mode on the display for a user while entering or operating in each of the first operation mode, the second operation mode and the third operation mode.

Hereinafter, a control method of an image processing apparatus will be described with reference to FIG. 5.

Figure 5:
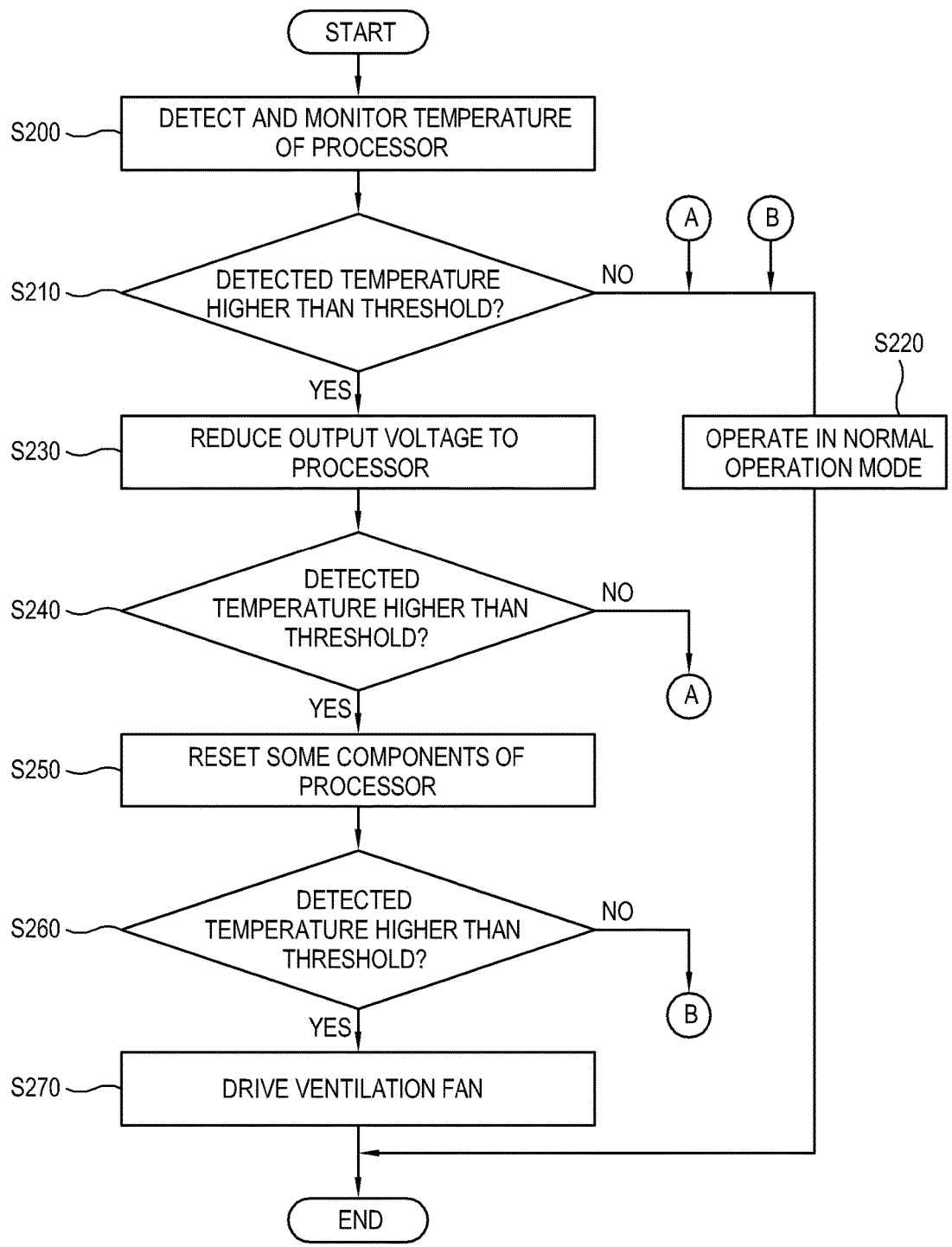
FIG. 5 is a flowchart illustrating a control method of an image processing apparatus according to an exemplary embodiment.

FIG. 5 is a flowchart illustrating a control method of an image processing apparatus according to an exemplary embodiment.

As shown in FIG. 5, the image processing apparatus monitors temperature of the processor (S200). The image processing apparatus determines whether the detected temperature is higher than a threshold (S210).

When the temperature is not higher than the threshold, the image processing apparatus works in a normal operation mode (S220). However, when the temperature is higher than the threshold, the image processing apparatus reduces output voltage to the processor 310 (S230).

The image processing apparatus 100 determines whether the detected temperature is higher than another threshold (S240).

When the temperature is not higher than the threshold, the image processing apparatus works in the normal operation mode (S220). However, when the temperature is higher than the threshold, the image processing apparatus resets some components of the processor (S250).

The image processing apparatus determines whether the detected temperature is higher than another threshold (S260).

When the temperature is not higher than the threshold, the image processing apparatus works in the normal operation mode (S220). However, when the temperature is higher than the threshold, the image processing apparatus drives a ventilation fan (S270).

According to a series of cooling processes described above, the temperature of the processor may be efficiently reduced and the ventilation fan may operate as little time as possible to suppress noise and/or dust problems.

According to one or more exemplary embodiments, the different modes which each correspond to ever increasing heat dissipation tactics may each consist of a different combination and balance of the different options. For example, the normal state may continue to include no additional implementation of cooling. However the first mode may specifically include a small or targeted decrease in voltage to processing components. Then when the apparatuses enters the second mode, not only will the apparatus reset and/or disable components but may now adjust voltages of other components differently than in the first mode based on, for example, what components are now disabled or reset. For example if an antenna circuit is reset or deactivated then the associated signal processor can also be deactivated or at least have the voltage reduced. Further, once the fan is activated in the third mode the specific deactivated and voltage lowered components made be shifted to components that are, for example, farther from the fan or airflow.

According to one or more exemplary embodiments, the threshold conditions for moving from one mode, or state, to another may be different depending on what mode the apparatus is currently in. For example, a first temperature may need to be met to move from a normal mode to a first mode of cooling, but a different temperature that is, for example, lower than the first temperature may be needed for the device to move back down to the normal node. This may provide a level of hysteresis in the system to avoid rapid switching between modes/states. Further, according to another exemplary embodiment, different temperature ranges may be used to determine when the apparatus moves from one state to another or a different combination of sensor temperature reading may be required for each transition. For example in order to move up to using a fan the temperature of the CPU may be the only temperature needed to be very high without a need for other certain temperatures of other components to also be high. However, to leave the fan state the temperature of the other components may also control defining when the system is deemed cool enough to transition out of the fan state.

Hereinafter, operations of a power control module 612, a reset module 613, a DC/DC converter 622 and a processing module 611 in a first operation mode and a second operation mode will be described in detail with reference to FIG. 6.

Figure 6:
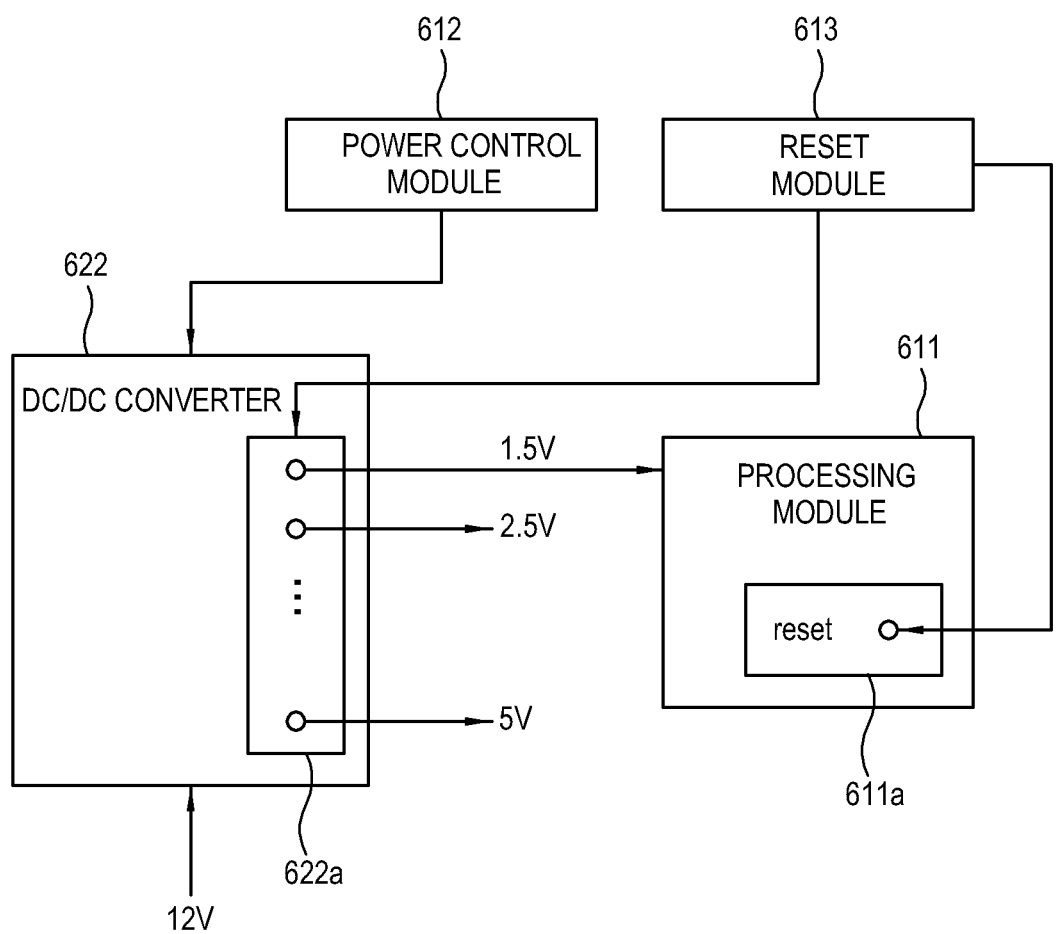
FIG. 6 illustrates a signal transmitting form in a processor in a first operation mode or a second operation mode in an image processing apparatus according to an exemplary embodiment.

FIG. 6 illustrates a signal transmitting form in a processor 610 in a first operation mode or a second operation mode.

As shown in FIG. 6, when a first voltage of, for example, 12 V, is input, the DC/DC converter 622 converts the first voltage into different levels of second voltages of 1.5 V, 2.5 V, 3.3 V and 5V. The DC/DC converter 622 provides each level of second voltage to a processing module 611 through each output terminal 622a.

In the first operation mode, the power control module 612 adjusts a particular level of second voltage to decrease to a desired level while the DC/DC converter 622 converts the first voltage into the second voltages. For example, to output a second voltage of 1.4 V reduced from original 1.5V through the output terminal 622, the DC/DC converter 622 converts the first voltage of 12 V into a second voltage of 1.4 V, not into 1.5 V.

In the second operation mode, the reset module 611 transmits a reset signal to a reset pin 611a in the processing module 611. When the reset pin 611a receives the reset signal, the reset module 613 performs a reset operation. Alternatively, the reset module 613 disables the output terminal 622a to output specific voltage, so that a processing module 611 configured to receive the voltage is reset or disabled.

Although the image processing apparatus includes no display panel has been illustrated in the foregoing exemplary embodiment, a display apparatus having a display panel may be also employed. In the display apparatus, a cooling process may be also carried out according to the temperature of the processor in the same manner as in the image processing apparatus. However, in the display apparatus, a display panel may have a light emitting element to display an image, and thus heat substantial to be monitored may be generated from the light emitting element as well as from the processor, which will be described below with reference to FIG. 7.

Figure 7:
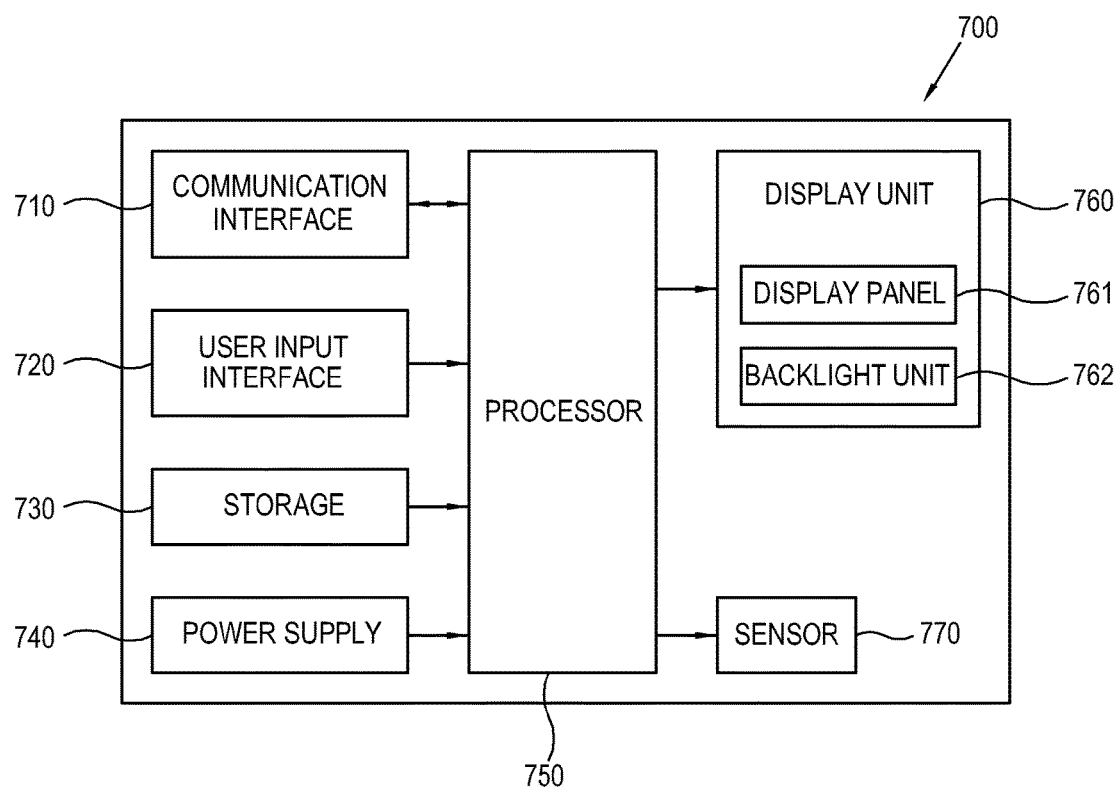
FIG. 7 is a block diagram illustrating a configuration of a display apparatus according to an exemplary embodiment.

FIG. 7 is a block diagram illustrating a configuration of a display apparatus 400 according to a second exemplary embodiment.

As shown in FIG. 7, the display apparatus 700 that includes a communication interface 710, a user input interface 720, a storage 730, a power supply 740, a processor 750 and a display unit 760. The communication interface 710, the user input interface 720, the storage 730 and the power supply 740 are substantially similar as those mentioned above in the exemplary embodiment as shown in FIG. 1, and thus descriptions thereof are omitted herein.

The display unit 760, which may be configured as either a self light emitting element or a non-self light emitting element, is configured as a non-self light emitting element in the present exemplary embodiment. The non-self light emitting display unit 760 includes a display panel 761 and a backlight unit 762 to provide light to the display panel 761.

At least one sensor 770 detects at least one of temperature of the processor 750 and temperature of the backlight unit 762. In the present exemplary embodiment, a plurality of sensors 770 may be provided to detect the temperature of the processor 750 and the temperature of the backlight unit 762, respectively. Because the processor 750 and the backlight unit 762 may be accommodated in one housing, when the temperature of the backlight unit 762 to generate light rises, heat from the backlight unit 762 may affect the processor 750.

Accordingly, when the sensors 770 detect that at least one of the temperature of the processor 750 and the temperature of the backlight unit 762 rises above a preset first temperature, the processor 750 performs a cooling process in the same principle as in the exemplary embodiment. The cooling process is substantially the same as in the exemplary embodiment and thus a description thereof is omitted herein.

A self light emitting display unit may not include a backlight unit 762, in which light is generated from a display panel, and thus a method of detecting temperature of the display panel may be employed.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
a processor comprising a plurality of sub processors;
a power supply configured to supply an operating voltage to the plurality of sub processors;
a sensor configured to detect a temperature of the processor; and
a controller configured to control the power supply to supply a lower level operating voltage to at least one first sub processor of the plurality of sub processors in response to the detected temperature of the processor being greater than a first temperature, and reset or disable at least one second sub processor of the plurality of sub processors in response to the detected temperature of the processor being greater than a second temperature,
wherein, when the at least one second sub processor of the plurality of sub processors is being reset or disabled, the at least one first sub processor of the plurality of sub processors is supplied with the lower level operating voltage.

2. The image processing apparatus of claim 1, wherein the lower level operating voltage is within a voltage range configured to ensure a normal operation of the processor when the detected temperature of the processor is greater than the first temperature.

3. The image processing apparatus of claim 1, further comprising:
a ventilation fan configured to be driven to cool the processor,
wherein the controller is further configured to operate the ventilation fan in response to the detected temperature being greater than a third temperature while the at least one second sub processor of the plurality of sub processors is reset or disabled.

4. The image processing apparatus of claim 3,
wherein the first temperature is set higher than the second temperature, and
wherein the second temperature is set higher than the third temperature.

5. The image processing apparatus of claim 3, wherein the first temperature, the second temperature, and the third temperature are set to a same value.

6. The image processing apparatus of claim 1, wherein the controller is further configured to display a message reporting system abnormality through a display in response to a cooling process comprising the at least one first sub processor of the plurality of sub processors being supplied the lower level operating voltage and the at least one second sub processor of the plurality of sub processors being reset or disabled at least a preset number of times within a preset time period.

7. The image processing apparatus of claim 1, further comprising:
a display unit,
wherein the sensor detects temperature of at least one of the processor and the display unit.

8. A control method of an image processing apparatus, the control method comprising:
supplying an operating voltage to a plurality of sub processors included in a processor;
detecting a temperature of the processor;
supplying a lower level operating voltage, that is a voltage lower than the operating voltage to at least one first sub processor of the plurality of sub processors when the detected temperature of the processor is greater than a first temperature; and
resetting or disabling at least one second sub processor of the plurality of sub processors when the detected temperature of the processor is greater than a second temperature,
wherein, when the at least one second sub processor of the plurality of sub processors is being reset or disabled, the at least one first sub processor of the plurality of sub processors is supplied with the lower level operating voltage.

9. The control method of claim 8, wherein the supplying the lower level operating voltage comprises:
decreasing the operating voltage supplied to the at least one first sub processor of the plurality of sub processors to a level of the lower level operating voltage within a voltage range configured to ensure a normal operation of the at least one first sub processor of the plurality of sub processors.

10. The control method of claim 8, wherein the image processing apparatus includes a ventilation fan configured to be driven to cool the processor, and configured to operate in response to the detected temperature of the processor being greater than a third temperature while the at least one second sub processor of the plurality of sub processors is reset or disabled.

11. The control method of claim 10, wherein the first temperature is set higher than the second temperature, and
wherein the second temperature is set higher than the third temperature.

12. The control method of claim 10, wherein the first temperature, the second temperature, and the third temperature are set to a same value.

13. The control method of claim 8, further comprising:
displaying a message reporting system abnormality in response to a cooling process comprising the supplying the lower level operating voltage to the at least one first sub processor of the plurality of sub processors and resetting or disabling the at least one second sub processor of the plurality of sub processors a preset number of times within a preset time period.

14. The control method of claim 8, wherein the image processing apparatus includes a display unit, and wherein the detecting the temperature of the processor comprises:
detecting temperature of at least one of the processor and the display unit.

15. An image processing apparatus comprising:
a processor comprising a plurality of sub processors configured to operate within a voltage range;
a controller configured to control a power supply to supply a lower level operating voltage to at least one first sub processor of the plurality of sub processors in response to a detected temperature of the processor being greater than a first temperature, and reset or disable at least one second sub processor of the plurality of sub processors in response to the detected temperature of the image being greater than a second temperature,
wherein, when the at least one second sub processor of the plurality of sub processors is being reset or disabled, the at least one first sub processor of the plurality of processors is supplied with the lower level operating voltage.

16. The image processing apparatus of claim 15 further comprising:
a fan;

wherein the fan operates based on the detected temperature of the processor.

* * * * *